J. FRANKLE
Distance Instrument.
No. 58,241. Patented Sept. 25, 1866.
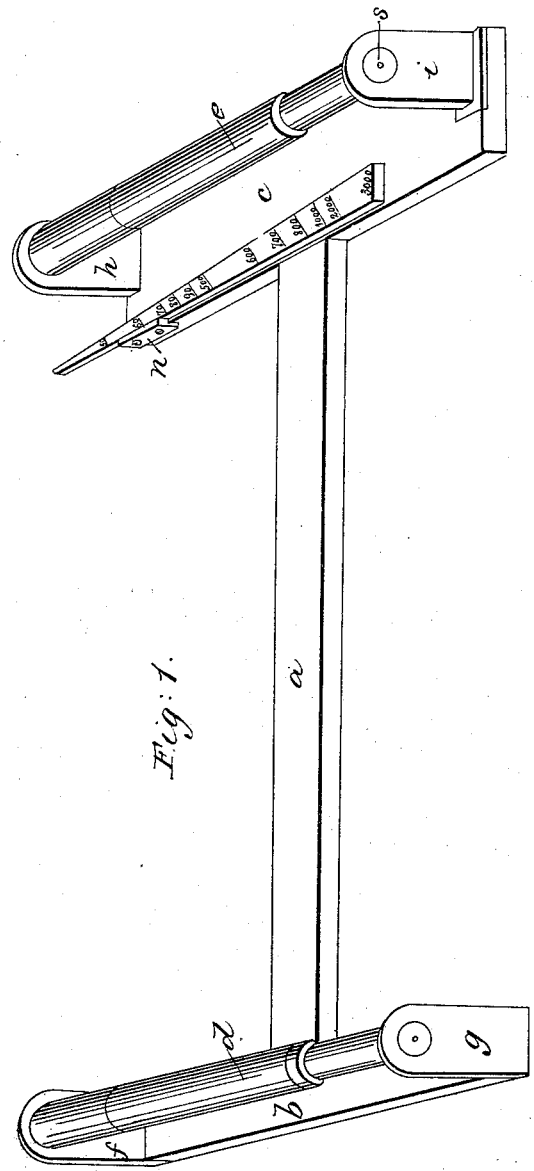
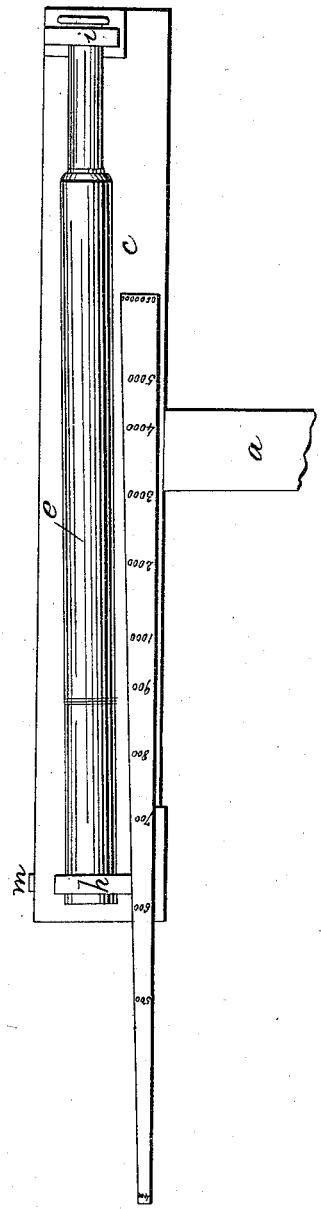
Fig. 1.
Fig. 2.
Witnesses.
R. S. Briggs
J. A. Greely
Inventor.
Jones Frankle

UNITED STATES PATENT OFFICE.

JONES FRANKLE, OF AMESBURY, MASSACHUSETTS.

IMPROVEMENT IN INSTRUMENTS FOR MEASURING DISTANCES.

Specification forming part of Letters Patent No. 58,241, dated September 25, 1866; antedated September 13, 1866.

*To all whom it may concern:*

Be it known that I, JONES FRANKLE, of Amesbury, in the county of Essex and State of Massachusetts, have invented an Improved Instrument for Measuring Distances; and I do hereby declare that the same is fully described and represented in the following specification and accompanying drawings, of which—

Figure 1 is a perspective view, and Fig. 2 a top view, of such instrument.

In the drawings of the above-mentioned instrument, Fig. 1, I have represented two telescopes attached to a frame at a convenient distance from and parallel with each other. The telescope on the left of the frame is stationary; the other, on the right of the frame, is not, turning on the pivot *i*, and inclining toward the telescope on the left of the frame. These telescopes being constructed with cross-hairs or spiders' thread over the lens, a prolongation of the parallel lines is readily obtained; but when one telescope inclines toward the other the lines meet or cross each other. The inclined plane, as seen in the drawing, Fig. 2, allows the outer end of the telescope on the right of the frame to incline toward the one on the left, and indicates the distance at which the extended lines from the telescopes converge.

The construction of my instrument for practical surveying or measuring is as follows: The distance at which the two telescopes are placed apart depends somewhat on the extent of the lines to be measured. For measuring distances from two to five thousand yards it requires about five yards between the telescopes. Under two thousand yards three yards or even less will answer. Without confining myself to any definite length of piece *a*, but generally from two to five yards, according as an instrument of more or less capacity is required, I attach piece *a* on the left end thereof, piece *b* at the center thereof, also piece *c* in like manner to piece *a*, at the right end thereof, said pieces *b* and *c* being firmly attached to piece *a*, and at right angles therewith, and of the same length as the telescopes *d* and *e*.

Telescope *d* is supported by two upright rests, one at each end, and firmly secured to either end of piece *b*.

Telescope *e* is supported by piece *i*, constructed with a pivot, which is inserted in piece *c*, so as to admit of telescope *e* inclining its outer end toward telescope *d*. The outer end of telescope *e* is supported by rest *h*, which moves back and forth on piece *c*, according as the inclined plane *o* is moved up or drawn back. Piece *m* is attached to piece *c*, and, projecting above it, prevents piece *h* or rest *h* from passing beyond it or beyond a parallel line with telescope *d*.

The length, width, and inclination of piece *c* depends upon the distance apart the telescopes are placed.

In my instrument, for measuring any distance from four hundred to five thousand yards, piece *a*, or the distance between the telescopes, is five yards, being the perpendicular of the triangle from telescope *d* to the point where the lines of the telescopes converge, is the base of the triangle, and from thence to telescope *e* is the hypotenuse of the triangle.

The angle of telescope *e*, for four hundred yards, is forty-two minutes and fifty-eight seconds.

Piece *o* is fifty-one and fifty-eight hundredths inches in length, or one-fiftieth of an inch length to every second between forty-two minutes and fifty-eight seconds and infinity or parallel lines. The inclination between the small end of piece *o* and the large end thereof is equivalent to the arc of a circle for forty-two minutes and fifty-eight seconds, of which the length of telescope *e* is the radius; therefore all the angles corresponding to any distance between four hundred yards and five thousand, or even to the full capacity of the telescopes, are readily transferred to the inclined plane *o*, or rather the distance corresponding to any angle is transferred to inclined plane *o*.

Piece *n* is attached to piece *c*, and, projecting above it, forms a back-rest, against which inclined plane *o* slides. Said inclined plane *o* having been graduated with every additional five or ten yards, from four hundred to five thousand, or to the extent or capacity of the telescopes, it follows that when the telescopes, or a prolongation of the lines thereof, center in a distant object, the distance of said object will be correctly indicated by sliding inclined plane *o* up, so as to fill the space between rests *h* and *n*.

It will be observed that telescope *d* is stationary, and forms a right angle with piece *a*, while telescope *e* is movable at its outer end, *h*, by means of the pivot-rest *i*, by means of which the desired angles may be obtained, corresponding to the distances at which a prolongation of the lines of the telescopes converge.

The instrument can be used as it is to find the longitudinal distance, as also the height, of any object by inspection, or with a compass adjusted to it, in order to obtain the diversion of the line measured or the object aimed at from the magnetic needle. It can also be used in connection with other lenses and reflecting-mirrors mechanically so arranged and adjusted as to enable one person to operate on the instrument and find the distance and measurement.

The slider O, on which is the graduated scale, is moved by any mechanical contrivance, and the whole instrument also rests on such mechanical contrivance, properly arranged as to secure a steady base, and able to be moved in any direction.

The construction of telescopes with spider-threads or hair-sights across the lens is not new, nor do I claim this as a part of my invention; also, the measuring of distances by triangulation, having three parts of the triangle given to find the others, I do not claim, nor any mechanical contrivance in connection with the instrument as above mentioned; but

What I claim as my invention, and desire to secure by Letters Patent, is—

The combination of the inclined plane *o*, graduated with distances, and the telescopes *d* and *e*, arranged substantially as herein set forth.

JONES FRANKLE.

Witnesses:
   R. F. BRIGGS,
   J. A. GREELY.